United States Patent [19]
Garrett et al.

[11] 3,973,651
[45] *Aug. 10, 1976

[54] VEHICLE CHOCK

[75] Inventors: Kenneth John Garrett, Chesham; Ronald Denis Fox, Amersham, both of England

[73] Assignee: Humphrey Thompson Enterprises Limited, Pinner, England

[ * ] Notice: The portion of the term of this patent subsequent to Mar. 18, 1992, has been disclaimed.

[22] Filed: Nov. 4, 1974

[21] Appl. No.: 520,887

Related U.S. Application Data

[63] Continuation-in-part of Ser. No. 341,090, March 14, 1973, Pat. No. 3,871,492.

[30] Foreign Application Priority Data

| Mar. 15, 1972 | United Kingdom | 12096/72 |
|---|---|---|
| Mar. 15, 1973 | France | 73.09238 |
| Mar. 15, 1973 | Germany | 2312833 |
| Mar. 15, 1973 | Germany | 7309791[U] |
| Sept. 16, 1974 | Canada | 209271 |

[52] U.S. Cl. .................................. 188/32
[51] Int. Cl.² ............................. B60T 3/00
[58] Field of Search ................. 188/32, 4 R, 36

[56] References Cited
UNITED STATES PATENTS

| 1,610,112 | 12/1926 | Wendle et al. | 188/32 |
| 2,723,005 | 11/1955 | Wink | 188/32 |

Primary Examiner—Duane A. Reger
Attorney, Agent, or Firm—Fleit & Jacobson

[57] ABSTRACT

A chock for a vehicle wheel comprising a first plate, having a series of swaged down portions to rigidify the plate and to grip a roadway, a second, flexible plate welded at one end to said first plate, and a pin engageable in a hole at the other end of each plate, to deform the flexible plate to a curved shape, which conforms to the shape of a vehicle wheel. The pin can be removed and the chock flattened to a folded condition, with the pin then being placed in a slot in the flexible plate.

4 Claims, 4 Drawing Figures

VEHICLE CHOCK

This is a continuation-in-part of application Ser. No. 341,090 filed Mar. 14, 1973 now U.S. Pat. No. 3,871,492.

The present invention relates to chocks.

Various forms of chock have been proposed to prevent vehicles, such as motor cars, from moving when the handbrake is off and the vehicle is not in gear. The most conventional form of chock is a block of wood cut in isosceles right angle triangle form, the wheel bearing against the hypotenuse side which extends at an angle of 45° to the other two sides. Such a construction has two main disadvantages. Firstly, there is a tendency for the chock to be moved along the direction of roll of the wheel and secondly, the chock is an extremely bulky article.

It is now proposed, according to the present invention, to provide a chock which comprises a first substantially rigid plate engageable with a roadway, a second flexible plate overlying the first plate, first and second ends to each of said plates, means securing said plates together at said first ends, a removable member spacing the second end of the second plate away from the second end of the first plate, and a plurality of downwardly projecting elements on said first plate to grip a roadway in the form of swaged down portions of said first plate arranged so that every straight line extending transversely, perpendicularly to the direction of length of the first plate passes through at least one of the swaged down portions.

In a preferred construction, the two plates are secured together by welding at the one end and at the other end the second flexible plate is provided with reinforcement, for example in the form of an angle iron or channel section member. The first or lower plate is preferably made of a more robust material which is not capable of flexing and is provided with means to support said member and prevent collapse thereof. This may be in the form of an inverted V-section channel having an aperture therein to accommodate the end of the member. The member is preferably a pin which is preferably provided with a shoulder at its upper end, the neck portion, which extends above the shoulder, passing through an aperture in the upper plate and, where provided, in the reinforcing member. At its lower end the pin is so shaped as to pass through an aperture in the first or lower plate so as to engage on the roadway.

In order to assist in the grip between the first or lower plate and the roadway on which the chock is to be used, this first plate is downwardly swaged to form portions so arranged that there is no straight line extending transversely, perpendicular to the direction of length of the first plate, which does not pass through one of the swaged down portions. The downwardly projecting swaged portions serve firstly to engage and bite into the roadway and secondly to provide a reinforcement preventing buckling of the plate about a transverse axis.

With the chock of the present invention, in use, the vehicle rides on to the two plates, at said one end, forcing said one end into engagement with the roadway. The upper flexible plate then distorts to a curved form to conform to the periphery of the tyre of the vehicle. This causes downward pressure of the pin onto the roadway, the pin being so disposed that it does in fact itself engage the roadway. The chock can readily be disassembled, by removal of the pin, and in a preferred arrangement, the upper plate is provided with a slot in which the pin may be passed. In the folded up condition, the reinforcement preferably constitutes a catch to retain the other ends of the two sheets in engagement, this latch mechanism being readily releasable. It will be appreciated that in the folded condition the construction of the present invention is extremely compact and in a preferred construction is of the order of 9 inches long, 3 inches wide and ¾ of an inch high. This can readily be disposed in the trunk of a vehicle without taking up any undue amount of space.

In order that the invention may more readily be understood, the following description is given, merely by way of example, reference being made to the accompanying drawings, in which.

Figure 1:
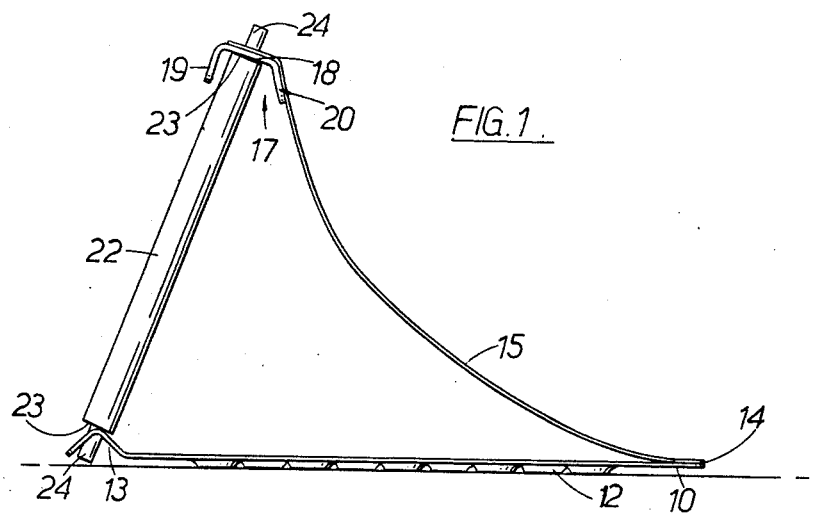
FIG. 1 is a side view of one embodiment of chock according to the invention, in the assembled condition.
Figure 2:
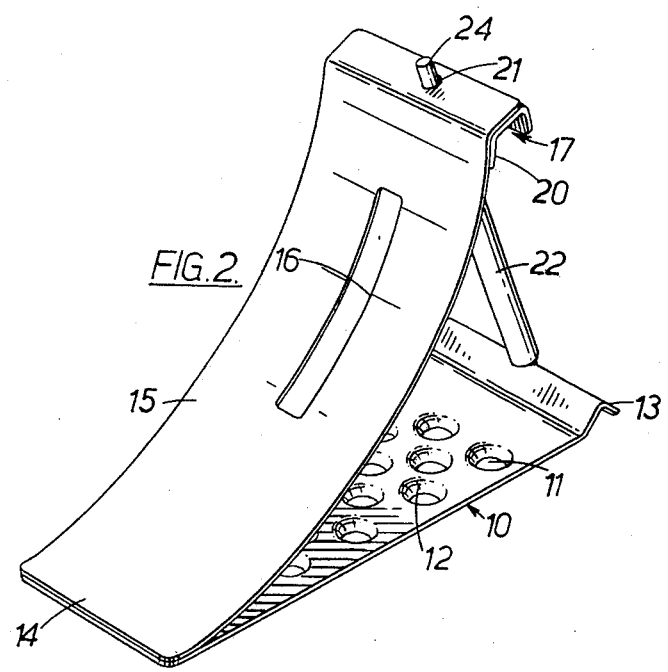
FIG. 2 is a perspective view of the chock of FIG. 1.
Figure 3:
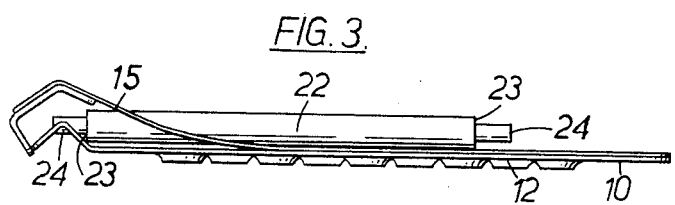
FIG. 3 is a side view of the chock of FIGS. 1 and 2 in the folded up condition.

Referring now to FIGS. 1 to 3 of the drawings, there is illustrated one embodiment of chock according to the invention and this comprises a lower plate 10 of mild steel construction. In this lower plate are punched holes 11 and in a further operation of a punching press the peripheries of these holes are swaged downwardly to form annular teeth 12. At the left hand end, as seen in FIG. 1, the lower plate 10 is provided with an inverted V-form channel 13 having a central aperture therein.

At the other end 14, there is secured, by spot welding, to the upper surface of the plate 10, a second plate 15, made of flexible material. This plate may in fact be constructed of a material such as spring steel suitably annealed, and is of substantially the same length and width as the plate 10 and has formed, longitudinally therein, a slot 16.

At the other end, remote from the welded end, the upper flexible plate 15 is reinforced by a channel section member 17 welded by its web portion 18 and having a downwardly projecting flange 19 and an angled flange 20. This angled flange 20 is also suitably spot welded to the adjacent portion of the flexible plate so that the latter is bent around two sides of the channel. A central aperture 21 is formed in the flexible plate and through the web of the channel.

In the assembled condition, a pin 22 having a shoulder 23 with a neck portion 24 at each end is arranged so that the neck portion at one end passes through the hole in the channel 13 and the neck portion of the other end passes through the hole 21 until the shoulder 23 engages the web portion 18. The pin 22 thus serves to support the plate 15 in the position shown in FIG. 2. The length of the neck 24 is sufficient for it to engage the roadway when passed through the aperture in channel 13.

The thus assembled construction is placed just in front of or behind the wheel of a vehicle, depending on whether it is desired to stop them going forwards or backwards and the vehicle is then moved so that the wheel engages onto the upper plate 15. The welded portion 14 is the first portion to engage under the periphery of a wheel tyre and this has the effect of forcing the adjacent portion of the plate 10 into engagement with the roadway. Any further movement to the left, as viewed in FIG. 1, causes the plate 15 to flex to a shape such that it conforms closely to the periphery of the wheel, regardless of the radius of curvature of the wheel.

The further weight imposed on the flexible portion 15 forces the pin 22 downwardly so that the lower neck portion 24 engages firmly against the road. The lower shoulder 23 also forces the inverted channel section portion 13 downwardly, thus pressing the full length of the lower plate 10 firmly downwardly into engagement with the road. The annular teeth 12 serve to dig into the road and give a strong resistance to slipping.

The annular teeth 12 also serve to rigidify the bottom portion or plate 10 and these are so disposed, as shown, so that there is no lateral straight line perpendicular to the length of the lower plate which does not pass through one of these annular teeth and an effective strengthening which resists buckling is achieved.

A construction as illustrated in FIGS. 1 to 3 has been tested with a heavy saloon motor car, weighing approximately 1½ tons, on a concrete roadway having a slope of 1 in 3 and the chock was found able to withstand the force without any buckling and without any slippage.

When one has finished using the chock, then by driving the vehicle off the plate to the right as viewed in FIG. 1, the whole chock assembly can be removed and the upper plate 15 can be flexed away from the lower plate allowing the pin 22 to be disengaged. The upper plate 15 can be pressed downwardly, to the position shown in FIG. 3, so that the bottom lip of the flange 19 engages over the edge of the inverted V-channel 13 and acts as a releasable catch, the resilience of the plate 15 permitting this to occur. The pin 22 can then be inserted through the slot 16 to complete the folded up assembly. This assembly is extremely compact and can readily be stowed in the trunk of a vehicle without taking up any undue space.

Figure 4:
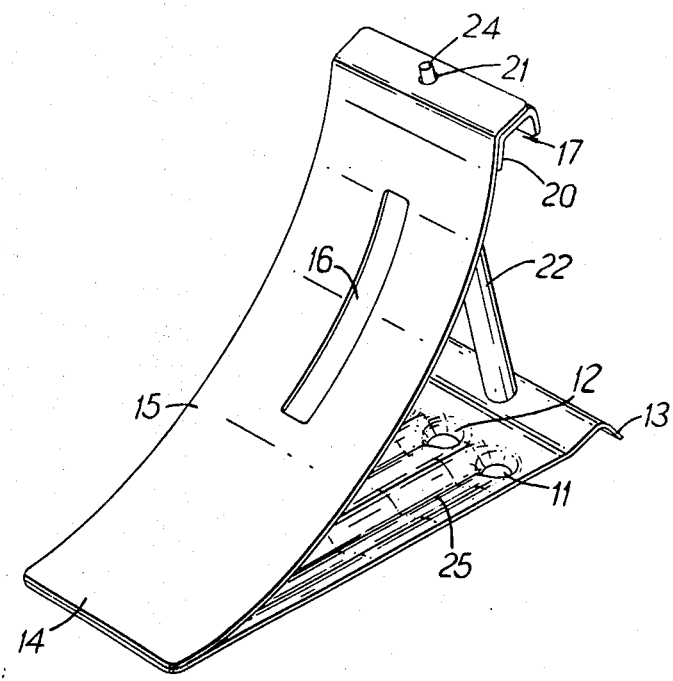
FIG. 4 is a perspective view, similar to FIG. 2, but showing a second embodiment of chock according to the invention.

FIG. 4 illustrates a second embodiment of chock according to this invention, this embodiment is the same as that illustrated in FIGS. 1 to 3, except in the construction of the lower plate 10. In this embodiment, the plate, instead of having a multiplicity of punched holes 11 has only two rows of such holes, each row comprising three holes. In the Figure only one of the rows is seen as the other row is near the end 14 of the plate and is hidden by the plate 15. The plate 15 also obscures in the view one of the holes of the row which can be seen. As will be apparent, the two rows extend transversly across the plate 10 and are longitudinally spaced from one another. Between corresponding holes in the two rows, the plate is swaged downwardly to form a corrugation 25. The three corrugations so formed serve to rigidify the plate 10 and also provide on the underside of the plate ridges which, like the teeth 12, grip the roadway in use of the chock.

It will be appreciated that many other variations are contemplated according to the invention. For example, the pin instead of being provided with shoulders at both ends could be provided with a taper at one or both ends. The actual formation of the lower plate 10 to assist in gripping can be varied substantially by providing other forms of serration on the bottom face. Furthermore, the bottom tread can be rigidified by other forms of strengthening reinforcement. The constructions illustrated are however, to be preferred because of their simplicity and ease of manufacture. The flexible plate may be formed of any suitable flexible material, e.g. metal, wood, reinforced plastics material or webbing, provided that it is sufficiently strong.

It will be appreciated that the constructions of the present invention are particularly suitable for chocking one wheel of a vehicle while the other wheels on the other side are being jacked up to effect a repair of some sort. This is particularly important when the jacking is required with the vehicle on a sloping roadway.

We claim:
1. A chock for a vehicle wheel comprising, in combination:
   a. a first substantially rigid plate engageable with a roadway;
   b. a second flexible plate overlying the first plate;
   c. first and second ends to each of said plates;
   d. means securing said plates together at said first ends;
   e. a removeable member spacing the second end of the second plate away from the second end of the first plate;
   f. two rows of holes punched in the first plate, the rows both being perpendicular to the length of the first plate; and
   g. a plurality of downwardly projecting elements on said first plate to grip a roadway in the form of swaged down longitudinally extending corrugations in the first plate, each extending between a swaged down peripheral portion of one hole of one row to a swaged down peripheral portion of one hole of the other row in the first plate, said swaged down longitudinally extending corrugations of said first plate arranged so that every straight line extending transversely, perpendicularly to the direction of length of the first plate passes through at least one of the swaged down longitudinally extending corrugations.

2. A chock as claimed in claim 1, and further comprising an inverted channel section reinforcement extending transversely of said second plate at said second end thereof, a web portion and two flange portions of said inverted channel section reinforcement, and weld means securing said web portion and one of said flange portions to said second plate.

3. A chock as claimed in claim 2, wherein said inverted channel section reinforcement and said inverted V-section channel are positioned to resiliently engage one another, effective to provide a releasable catch to retain said chock in a folded condition.

4. A chock as claimed in claim 3, and further comprising means defining a slot in said second plate, through which the pin may pass when the chock is in the folded condition.

* * * * *